United States Patent
Aziz

(10) Patent No.: US 8,868,713 B2
(45) Date of Patent: Oct. 21, 2014

(54) METHOD AND APPARATUS PROVIDING A USER INTERFACE FOR A REQUEST-ORIENTED SERVICE ARCHITECTURE

(75) Inventor: Mukaram Aziz, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 13/415,116

(22) Filed: Mar. 8, 2012

(65) Prior Publication Data

US 2013/0238685 A1 Sep. 12, 2013

(51) Int. Cl.
*G06F 15/16* (2006.01)
(52) U.S. Cl.
USPC .......................................... 709/223; 709/226
(58) Field of Classification Search
USPC .................. 709/200–203, 217–224, 225, 226
See application file for complete search history.

(56) References Cited

U.S. PATENT DOCUMENTS

| | | | | |
|---|---|---|---|---|
| 6,449,479 | B1* | 9/2002 | Sanchez | 455/433 |
| 7,127,240 | B2* | 10/2006 | Benco et al. | 455/417 |
| 7,236,780 | B2* | 6/2007 | Benco et al. | 455/432.1 |
| 7,266,371 | B1* | 9/2007 | Amin et al. | 455/419 |
| 7,398,294 | B2* | 7/2008 | Florkey et al. | 709/204 |
| 7,660,849 | B1* | 2/2010 | Shaffer et al. | 709/204 |
| 7,986,935 | B1* | 7/2011 | D'Souza et al. | 455/406 |
| 8,085,692 | B2* | 12/2011 | Vaught et al. | 370/260 |
| 8,255,281 | B2* | 8/2012 | Benson et al. | 705/26.1 |
| 8,295,465 | B2* | 10/2012 | Altberg et al. | 379/216.01 |
| 2007/0061405 | A1* | 3/2007 | Keohane et al. | 709/207 |
| 2008/0104169 | A1* | 5/2008 | Combel et al. | 709/204 |
| 2011/0296043 | A1* | 12/2011 | Sutton et al. | 709/229 |
| 2012/0159353 | A1* | 6/2012 | Beerse et al. | 715/756 |
| 2013/0132478 | A1* | 5/2013 | Belanger et al. | 709/204 |

* cited by examiner

*Primary Examiner* — Moustafa M Meky

(57) ABSTRACT

An approach for providing a request in a request-oriented service architecture is described. A user interface is presented. A verb-noun request based on an input into a user interface causes generation of a transaction based on a feature, declaration information, an action to be performed on the feature, and a current state of the feature. A response is received indicating that the current state of the feature is updated, at least in part, by the transaction. An indication relating to the response is presented by the user interface.

20 Claims, 16 Drawing Sheets

METHOD AND APPARATUS PROVIDING A USER INTERFACE FOR A REQUEST-ORIENTED SERVICE ARCHITECTURE

BACKGROUND INFORMATION

Service providers are continually challenged to deliver value and convenience to consumers by providing compelling network services and advancing the underlying technologies. For example, product and service features are frequently added to network services and systems to provide consumers with additional value and convenience. When designing a system, for instance, to deploy a new product or service, developers typically create or utilize architectures that focus on actual implementation of the product or service. Likewise, devices utilizing such products and services are typically configured to generate requests in a manner dictated by the actual implementation of the product or service. However, the development of any new product under this approach generally requires substantial time and effort and involves production systems that service many users at any one time, negatively affecting the overall cost, quality, and time-to-market for any new product or product feature.

Therefore, there is a need for a service architecture that is more flexible and effective in accommodating requests to utilize new services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing a request in a request-oriented service architecture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
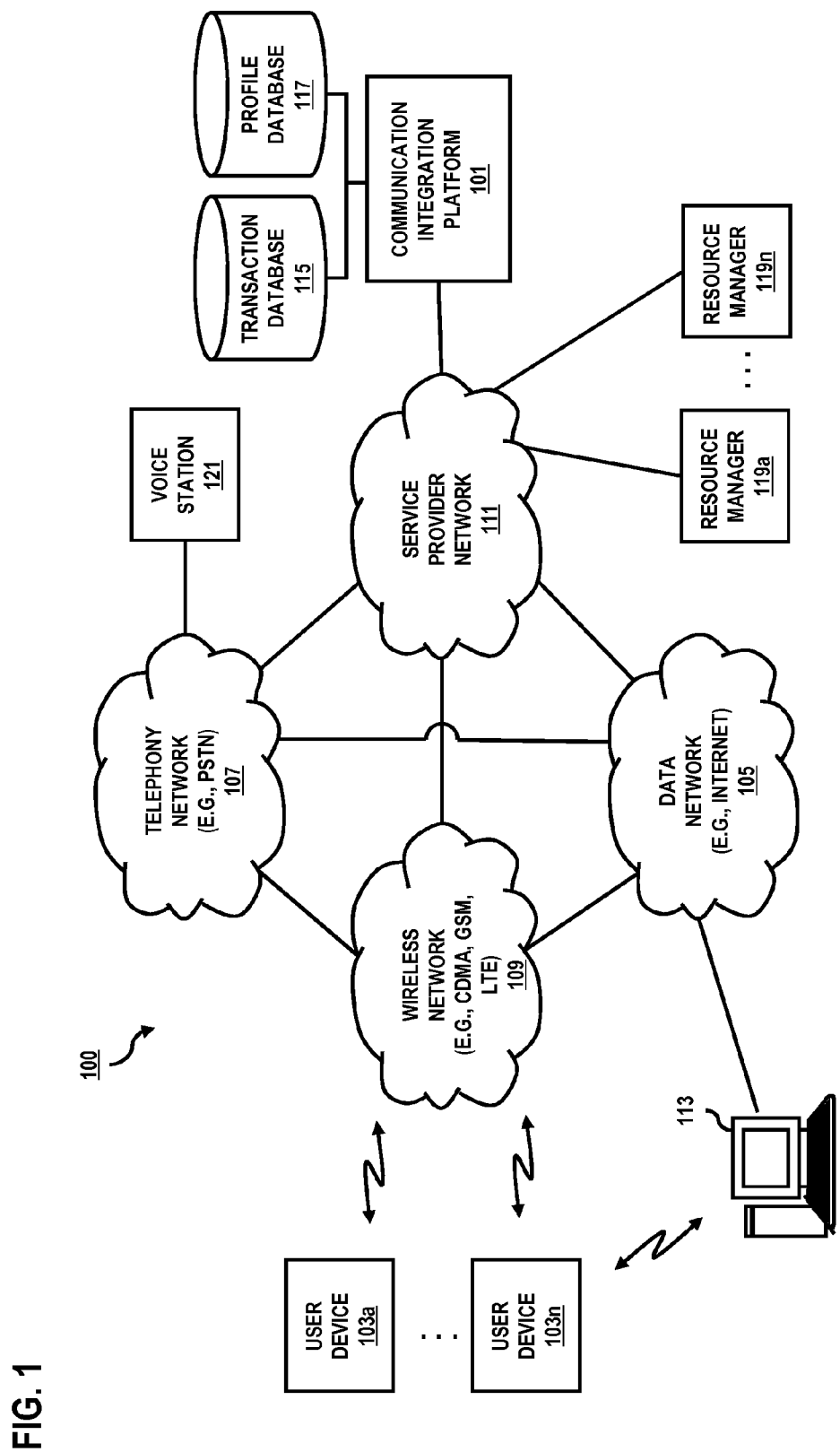
FIG. 1 is a diagram of a system capable of providing a user interface for a request-oriented service architecture (ROSA), according to an exemplary embodiment.

FIG. 1 is a diagram of a system capable of providing a user interface for a request-oriented service architecture (ROSA), according to an exemplary embodiment. For the purpose of illustration, the system 100 employs a communication integration platform 101 that is configured to facilitate communication across disparate systems by providing a request-oriented service architecture. One or more user devices (e.g., user devices 103 (or user devices 103a-103n)) may, for instance, be utilized to initiate requests to access product and/or service features across disparate systems over one or more networks (e.g., data network 105, telephony network 107, wireless network 109, service provider network 111, etc.). According to one embodiment, service and/or product features may be included as part of managed services supplied by a service provider (e.g., a wireless communication company) as a hosted or a subscription-based service made available to users of the user devices 103 through the service provider network 111. As shown, the communication integration platform 101 may be a part of or connected to the service provider network 111. According to another embodiment, the communication integration platform 101 may be included within or connected to the user devices 103, a computing device 113, etc. While specific reference will be made thereto, it is contemplated that the system 100 may embody many forms and include multiple and/or alternative components and facilities. Communication integration platform 101, in some embodiments, can effectively reduce overall costs, decrease the time-to-market, and improve the quality for product/service features by facilitating the requests that include the concrete definitions of the product/service features based on a request-oriented service architecture.

In certain embodiments, the communication integration platform 101 may include or have access to a transaction database 115 and a profile database 117 (e.g., a virtual enterprise state database). For example, the communication integration platform 101 may generate or update a transaction in the transaction database 115, and utilize the transactions to update product/service features in the profile database 117. In addition, in various embodiments, resource managers 119 (or resource managers 119a-119k) (e.g., event packages) may receive, for instance, a verb-noun request (e.g., initiated by a user device 103) and provide the transformation of the verb-noun request into a request that defines the behaviors and structures of the associated product/service features (e.g., such as those features that may be provided by a voice station 121) for a particular ROSA instance.

It is noted that the user devices 103 may be any type of mobile or computing terminal including a mobile handset, mobile station, mobile unit, multimedia computer, multimedia tablet, communicator, netbook, Personal Digital Assistants (PDAs), smartphone, media receiver, personal computer, workstation computer, set-top box (STB), digital video recorder (DVR), television, automobile, appliance, etc. It is also contemplated that the user devices 103 may support any type of interface for supporting the presentment or exchange of data. In addition, user devices 103 may facilitate various input means for receiving and generating information, including touch screen capability, keyboard and keypad data entry, voice-based input mechanisms, accelerometer (e.g., shaking the user device 103), and the like. Any known and future implementations of user devices 103 are applicable. It is noted that, in certain embodiments, the user devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of user devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 103, i.e., IP addresses that are accessible to devices connected to the service provider network 111 as facilitated via a router.

As mentioned, products and product features are frequently added to network services and systems to provide consumers with additional value and convenience. New product developments typically involve disparate system integration, which generally requires a system to provide means of maintaining a long-transaction extending beyond a particular system domain, transformations between the disparate systems, a common protocol and workflow/service system framework, and a clear, concrete implementation for the actions (and their derived actions) that define the behavior of the product being developed. Developers designing a system for a new product will create or utilize architectures (e.g., service-oriented architecture) emphasizing that a server includes the concrete implementation of the product (to varying degrees) and, thus, the definition of the product's features. In this manner, requests are generated in a manner dictated by the concrete implementation of the product (to varying degrees). However, the development of any new product under this approach generally requires substantial time and effort and involves production systems that service many users at any one time, affecting the overall cost, quality, and time-to-market for any new product or product feature.

To address this issue, the system 100 of FIG. 1 introduces the capability to provide a request in a request-oriented service architecture. Such a request allows any new product or product feature to be pushed away from the network (e.g., server) and into the request itself. In one scenario, a typical verb-noun request may be initiated by a user device 103 for access to a particular product or service feature. The verb-noun request may then be received by a resource manager 119 (e.g., an event package) that provides the transformation of the verb-noun request, for instance, into a canonical form that includes the declarations (or definitions) for the particular product or service feature. The transformed request may thereafter be transmitted from the resource manager 119 to a communication integration platform 101, which may then merge the contents of the request with the current state of the feature to generate (or update) a transaction in a long-transaction database (e.g., the transaction database 115) for updating the current state of the feature (e.g., in the profile database 117). The transaction may, for instance, specify the feature, the action to be performed on the feature, the current state of the feature, the declaration information, and a current status of the transaction. Additionally, or alternatively, the transaction may specify an intended state of the feature. In particular embodiments, the request may include the minimal information necessary to create, or update, the transaction. On the other hand, the transaction may be based on the request, the current state of the feature, and other requests, for instance, to provide the explicit action and status. It is noted that, in some embodiments, the transformed request (and its children) may, for instance, be the only means of defining the structure and behavior of a product or service feature. The platform 101 may be deployed within one or more servers, and act as a broker or a facilitator of the request rather than define or maintain the new product or product feature. As such, the servers may only be required to provide very abstract services for maintaining long-transactions, providing domain integrations points, and defining the request meta-model.

In certain embodiments, the communication integration platform 101 may decompose the request (e.g., a parent request) into one or more child requests based on the declaration information. The communication integration platform 101 may further route the one or more child requests to one or more destination resource managers (e.g., compensating resource managers 119) based on the declaration information. By way of example, the declaration information may include behavior declarations and/or structure declarations for product/service features. Since the behaviors and the structures for a product/service feature are declared in the request, they may, for instance, be utilized by the communication integration platform 101 as a set of "instructions" for breaking down the request into corresponding child requests and for routing of the child requests to the various resource managers 119 to carry out respective parts of the request. It is noted that, in some embodiments, the communication integration platform 101 may also act as a compensating resource manager. For example, a child request may be destined for the communication integration platform 101 to be further decomposed into one or more grandchild requests based on the declaration information.

In one embodiment, the request may include an action to setup a conference using a conferencing feature provided by a conferencing service. Based on the declaration information, the request may then be decomposed into several child requests, for instances, including: (1) a child request that includes the necessary behavior and structure declarations for a provisioning feature for routing to a provisioning adapter that will transform the child request into instructions to provision network resources (e.g., bandwidth) for the conference; (2) a child request that includes the necessary behavior and structure declarations for the directory feature for routing to a directory adapter that will transform the child request into instructions to provide contact information of invitees for the conference; and (3) a child request that includes the necessary behavior and structure declarations for the conference feature for routing to a conference adapter that will transform the child request into instructions to utilize the provisioned network resources and the contact information to setup the conference.

In various embodiments, the communication integration platform 101 may receive one or more child responses in response to the routing of the one or more child requests. The communication integration platform 101 may further generate a parent response based on the declaration information and the one or more child responses for transmission to the originating resource manager. By way of example, the provisioning adapter, the directory adapter, and the conference adapter may respectively transmit child responses with the state "completed," for instance, upon learning that the network resources have been provisioned, that the contact information has been provided, and that the conference has been setup based on the provisioned network sources and the contact information. As such, a parent response will be generated based on the declaration information to inform the originating resource manager (e.g., a conference event package) that the conference has been setup.

In other embodiments, the communication integration platform 101 may transmit the one or more child responses to a long-transaction database to trigger an update for the transaction in the long-transaction database, wherein the current state of the feature is updated in a profile database based on the updated transaction. In one scenario, when the child responses are respectively received from the provisioning adapter, the directory adapter, and the conference adapter with the state "completed," the communication integration platform 101 may, for instance, update the associated transaction in the long-transaction database. This may, in turn, cause an update to the current state of the feature (or features) in the profile database 117 (e.g., when the update to the transaction is detected by a virtual enterprise state manager).

Furthermore, the communication integration platform 101, the user devices 103, the computing device 113, the resource managers 119, the voice station 121, and other elements of the system 100 may be configured to communicate via the service provider network 111. According to certain embodiments, one or more networks, such as the data network 105, the telephony network 107, and/or the wireless network 109, may interact with the service provider network 111. The networks 105-111 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-111 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-111 may include components and facilities to provide for signaling and/or bearer communications between the various components or facilities of the system 100. In this manner, the networks 105-111 may embody or include portions of a signaling system 7 (SS7) network, Internet protocol multimedia subsystem (IMS), or other suitable infrastructure to support control and signaling functions.

Figure 2:
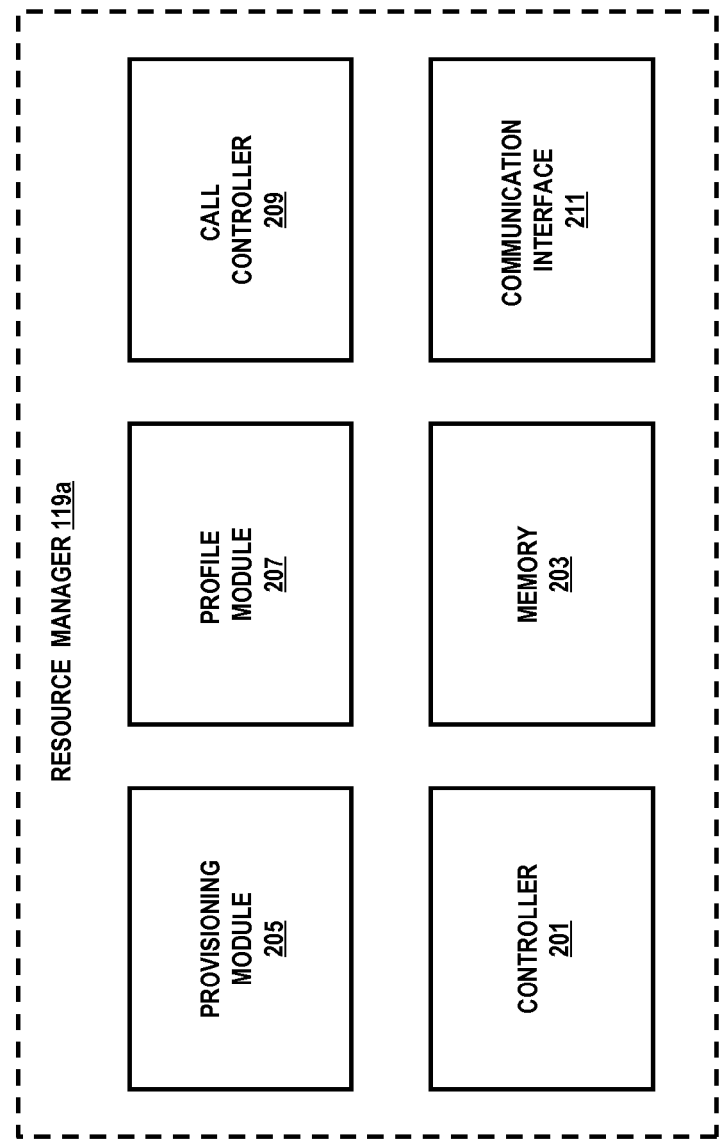
FIG. 2 is a diagram of the components of a resource manager, according to an exemplary embodiment.

FIG. 2 is a diagram of the components of a resource manager, according to an exemplary embodiment. The resource manager 119a may comprise computing hardware (such as described with respect to FIG. 10), as well as include one or more components configured to execute the processes described herein for providing the services of the system 100. It is contemplated that the functions of these components may be combined in one or more components or performed by other components of equivalent functionality. In certain embodiments, the resource manager 119a includes a controller (or a processor) 201, memory 203, a provisioning module 205, a profile module 207, a call controller 209, and a communication interface 211.

The controller 201 may execute at least one algorithm for executing functions of the resource manager 119a. For example, the controller 201 may interact with the provisioning module 205 to determine content to deliver to, for example, a user device 103a. The provisioning module 205 may then, for instance, specify a product (e.g., user agent, plug-in, application, etc.) to be provided to the user device 103a. Once the user device 103a is configured, the controller may interact with the profile module to determine settings associated with a user of user device 103a, such as a schedule calendar and contracts. The controller 201 may then, for example, interact with the call controller 209 to establish a connection between the user device 103a and another user device using a contact of the user.

The controller 201 may also work with the call controller 209 to facilitate the use of services provided by the resource manager 119a. The call controller 209 may establish a connection between any device provisioned and other devices (e.g., a voice station). Such a connection may be modified to, for example, provide a connection between more than two devices, hold or transfer an established connection, provide voice messaging services, and the like.

As mentioned, the controller 201 may further utilize the communication interface 211 to communicate with other components of the communication integration platform 101, the user devices 103, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. By way of example, such methods may be used to initiate transmission of child requests to their respective destination resource managers.

Figure 3:
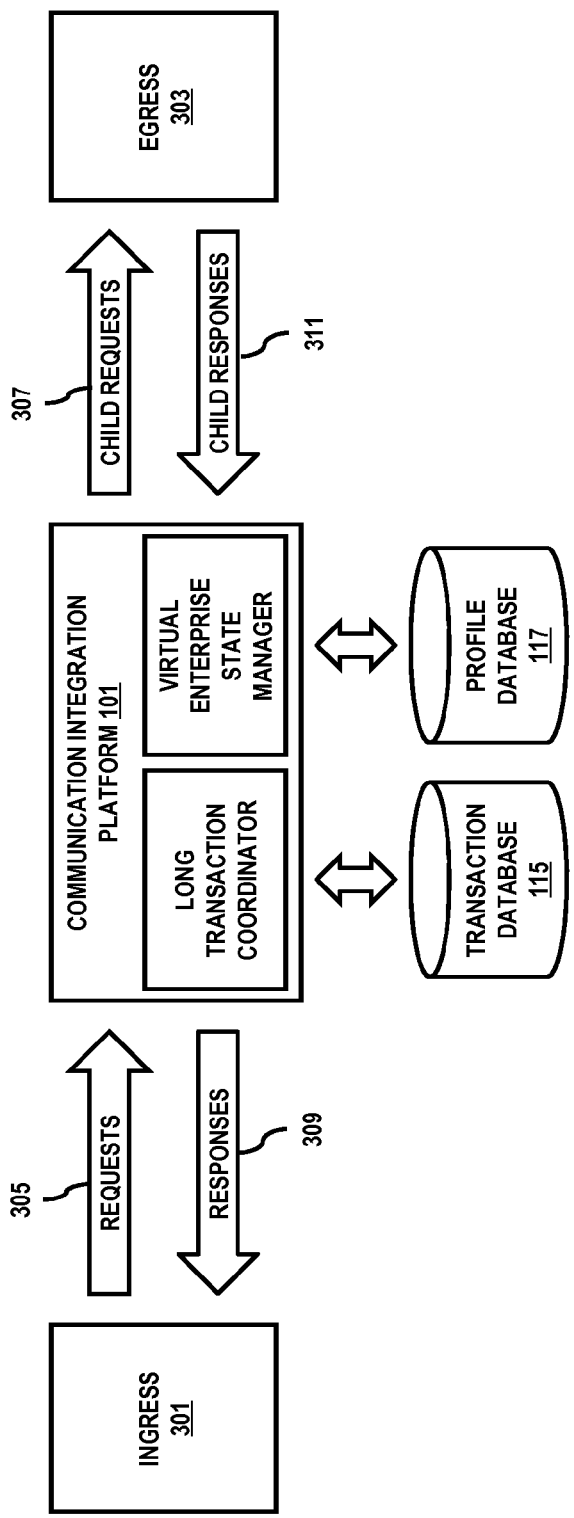
FIG. 3 is a diagram of interactions of a communication integration platform, according to an exemplary embodiment.

FIG. 3 is a diagram of interactions of a communication integration platform, according to an exemplary embodiment. As shown, in some embodiments, a request-oriented service architecture (ROSA) may be implemented based on a hub-and-spoke architecture model. In such an model, the communication integration platform 101 may, for instance, act as a facilitator (or the "hub") for various external domains while one or more resource managers (or the "spokes") provide the ingress and egress transforms (e.g., ingress 301 and egress 303) to the various external domains. Communications between the communication integration platform 101 and the resource managers (or other spoke endpoints) may, for instance, be performed by a canonical request/response protocol over a guaranteed delivery transport. As indicated, a long-transaction coordinator and a virtual enterprise state manager may work together to provide the current state of any request 305, child request 307, response 311, or child response 311 within a particular instance, or trusted group of instances, of a request-oriented architecture. It is noted that, in certain embodiments, the request-oriented service architecture may incorporate features from multiple systems and lines-of-business, and present them as one in a generic fashion (e.g., understood by the particular instance, the trusted group of instances, etc.).

In one embodiment, a request-orient service architecture moves the declaration (or definition) information (e.g., structural declarations, behavior declarations, etc., associated with a transaction, a feature, etc.) away from concrete system specification (e.g., web-services, UNIX-like daemons, window services, rule-engines or work-flow systems, etc.) to the request itself, which enables the request to "know" how to act within its own ROSA system or ROSA domain of systems. In other words, the request 305 may include declaration information that can be understood by a single ROSA instance or common/trusted ROSA instances/groups which share behavioral and structural definitions. However, an external (or untrusted) system may not understand, for instance, the definitions for the behaviors of another system.

In one scenario, an external application may send a traditional verb-noun request pattern to instigate a system-task. Once received at the ingress 301, a transform to the internal canonical form of that request may occur, forming, for instance, the request 305. This canonical form may contain both structure and behavior definitions, derived from the original verb-noun request. Thus, from the ingress point, the request 305 may be self-sufficient. That is, the request 305 may have its own life-cycle and the ability to traverse its environment in order to accomplish the task for which the request 305 was intended. In some embodiments, the request 305 may include the current state of the system and the concept library (and/or aspect dictionary) for the particular ROSA instance. As used herein, a "concept" may refer to a language neutral operation or type (e.g., for a particular ROSA instance), and an "aspect" may define the meaning of a structure, a behavior, etc. As an example, an Extensible Markup Language (XML) library may be utilized as the concept library, and the various functions (or other constructs) created by architects and developers for defining behaviors, structures, or other elements may make up aspects of the aspect dictionary.

In a further scenario, the communication integration platform 101 may receive the request 305 from an originating resource manager (e.g., an event package configured to act as a compensating resource manager 119 at the ingress 301) and then merge the request 305 with a current state of the virtual enterprise to create, or modify, a long-transaction (e.g., a transaction that extends beyond the system domain, but not necessarily "long" in terms of time) that is stored, or updated, in the long-transaction database 115. As such, an update to the relevant portions of the profile database 117 may then be automatically initiated. In certain embodiments, the profile database 117 is not updated directly. Instead, the profile database 117 is updated by a transaction that is created, or modified, by requests (e.g., requests/responses 305, 307, 309, and 311).

Then, the communication integration platform 101 may decompose the requests 305 into child requests 307 (e.g., based on the behavior declarations in the request 305) and subsequently route the child requests 307 to their respective destinations (e.g., based on the behavior declarations). It is noted that spokes of a hub-and-spoke architecture may include the destination components, which may, for instance, be compensating resource managers (e.g., adapters of product/service features). It is also noted that, in some cases, the destination for the child requests 307 may be within the communication integration platform 101 (e.g., if the communication integration platform 101 is acting as the associated compensating resource manager), allowing for those child requests 307 to be further decomposed into grandchild requests for routing to their respective destinations.

In response to the routing of child requests 307, the communication integration platform 101 may receive child responses 311 from the destination components. A long-transaction coordinator may then trigger an update to the associated transaction in the transaction database 115, which, in turn, may cause an update to the current state of the virtual enterprise. Based on the behavior declarations of the request 305 (e.g., the parent request), a response 309 may, for instance, be generated and sent to the originator of the request 305 (e.g., the event package configured to act as a compensating resource manager 119) once all of the child responses 311 are collected and analyzed. In various embodiments, the response 309 may, for instance, relate to the updated state of the virtual enterprise state.

In various embodiments, the difference between a request 305 and a transaction is that the request 305 may only include the minimal information necessary to create, or update, the transaction, but the transaction itself would use the current enterprise state and other requests 305 to provide the explicit action and status. Nonetheless, the schemas for a request 305 and a transaction may be identical even where their respective contents are different. In some embodiments, the schemas for the various requests and responses may also be the same even if, for instance, their respective actions may be different. As such, there may be no need for an explicit "request" or "response" type, since they may both just be variations of the "transaction" type.

Figure 4:
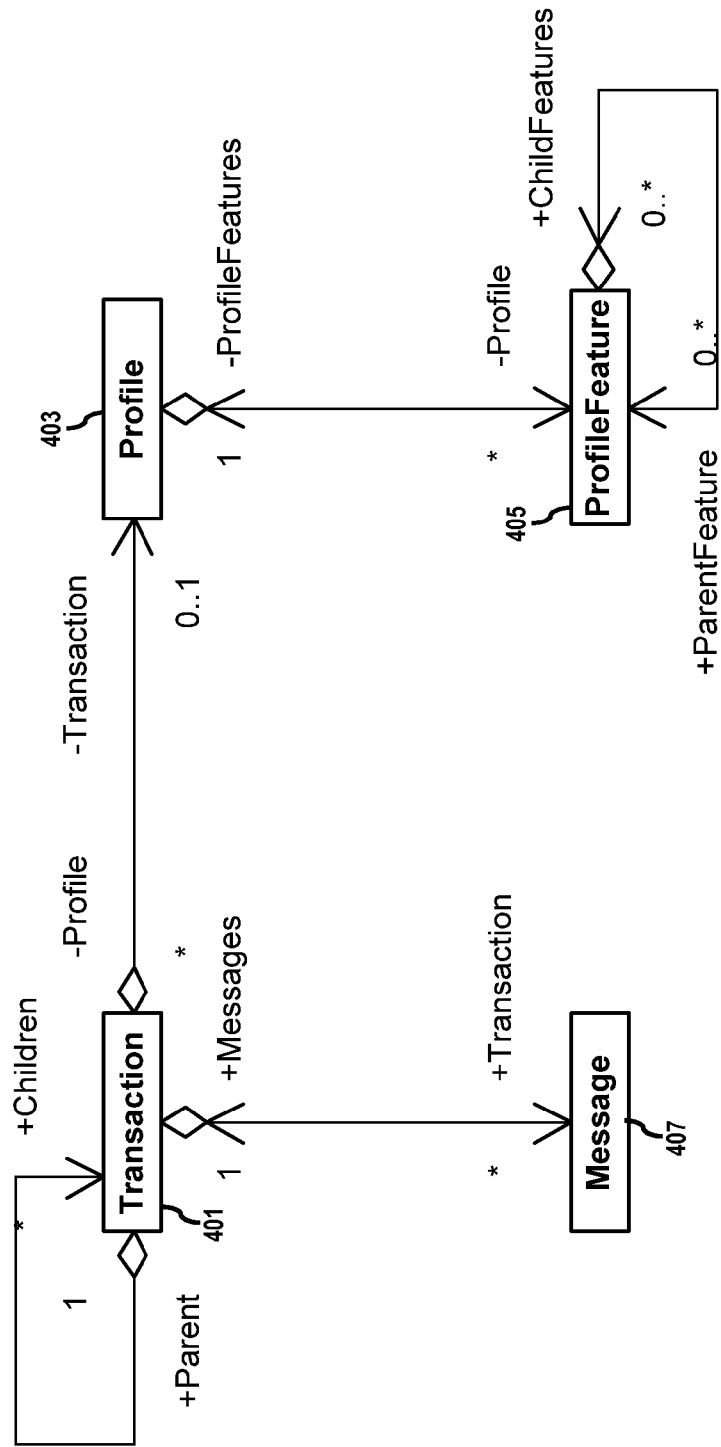
FIG. 4 is a diagram of a transaction database schema for a request-oriented service architecture, according to an exemplary embodiment.

FIG. 4 is a diagram of a transaction database schema for a request-oriented service architecture, according to an exemplary embodiment. Specifically, FIG. 4 is a unified modeling language (UML) diagram for the transaction database schema, which, for instance, illustrates a transaction type 401, a profile type 403, a profile-feature type 405, and a message type 407. It is noted that, in various embodiments, a virtual enterprise state database schema may include the profile type 403 and the profile-feature type 405 (but not the transaction type 401). By way of example, the transaction type 401 may hold the transaction status and the action to be performed for a particular profile and its features. Moreover, the profile type 403 may hold the identity of the billable entity along with its features (of the profile-feature type 405), and the profile-feature type 405 may hold its current state and actions to be performed. In addition, the message type 407 may be associated with a transaction, for instance, to provide human-readable summaries and history of status information.

As mentioned, the transaction type 401 may be utilized for a request and a response (e.g., parent request 305, child request 307, parent response 309, child response 311, etc.). As shown, in this scenario, a parent request may be associated with (and decomposed into) many child requests, while a child request may only be derived from, or associated with, one parent request. In addition, as depicted, an element of the transaction type 401 may, for instance, specify up to one instance of the profile type 403 and its instances of the profile-feature type 405. However, in some cases, the particular instances of the profile type 403 and the profile-feature type 405 may be specified by more than one element of the transaction type 401 in the transaction database 115. As such, in certain embodiments, the transaction database 115 may allow for multiple instances of a single profile and its features. It is noted that, in some embodiments, differences between the transaction database schema and the virtual enterprise state database (or profile database) schema may exist. For example, the transaction database schema may hold a transaction element and allow for multiple instances of a single profile and its features. On the other hand, the virtual enterprise state database (or profile database) schema may not include the transaction element and may only allow for up to one instance of any particular profile and its various features. Nonetheless, despite potential schema differences, the transaction database 115 and the profile database (or virtual enterprise state database) 117 may, for instance, work together to provide the history of requested changes, the current status of changes occurring at any point in time, the current state of the enterprise at any point in time, etc.

Figure 5:
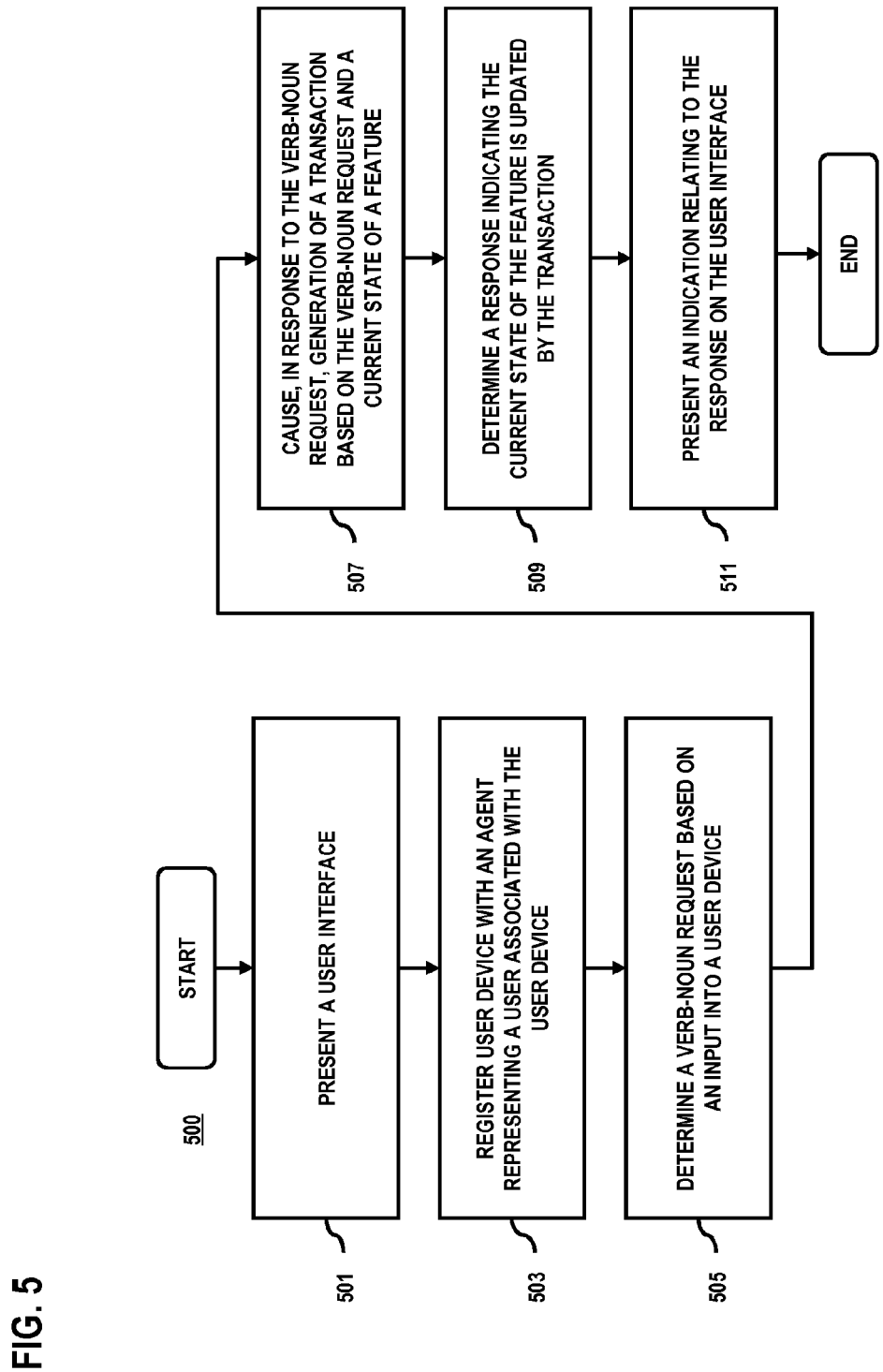
FIG. 5 is a flowchart of a process for providing a request in a request-oriented service architecture, according to an exemplary embodiment.

FIG. 5 is a flowchart of a process for providing a request in a request-oriented service architecture, according to an exemplary embodiment. For the purpose of illustration, process 500 is described with respect to FIGS. 1 and 2. It is noted that the steps of the process 500 may be performed in any suitable order, as well as combined or separated in any suitable manner. In step 501, a user device 103a presents (e.g., displays) a user interface (e.g., graphical user interface (GUI)). The user interface may be initiated, for example, by invoking an application on user device 103a, directing a web browser to a website associated with platform 101, invoking a plug-in installed in a program, invoking of a user agent, and the like. It is contemplated that the user interface may be initiated automatically, for example, by a detection of an event (e.g., incoming response, an offer to establish a connection initiated by a request, etc.). Next, user device 103a registers, as in step 503, with an agent representing a user associated with user device 103a such as, for example, platform 101, resource manger 119b, and the like. By way of example, a proxy device (e.g., resource manager 119b configured as an originating resource manager) accepts information from user device 103a indicating a user (e.g., user name, account number, etc.) and credentials related to the user. The proxy device associates user device 103a with the user based on the information indicating the user and received credentials. In this manner, multiple devices (e.g., user device 103b, computing device 113, etc.) may be used to access the services of platform 101 and resource manager 119a. Next, user device 103a determines, as in step 505, a verb-noun request based on an input into user device 103a. For example, user device 103a presents a display or other means that detects an input indicating a connection with another device (e.g., an input of a phone number, or a selection of a user associated with a device) and user device 103a determines a verb-noun request to facilitate the input such as, for example, a provisioning of a bandwidth necessary for the connection. As is discussed further with regards to FIG. 6A, a proxy device may be used to convert a verb-noun request into a canonical request used by platform 101 to facilitate use of a request-oriented service architecture. It is contemplated that the services of a proxy device (e.g., converting a verb-noun request into a canonical request) may be performed by a user device, computing device, platform 101, and the like. As such, the converting a verb-noun request into a canonical request may be performed by a user device or the platform 101.

In step 507, the platform 101 causes, in response to the verb-noun request, generating of a transaction based on the verb-noun request and a current state of a feature. The transaction may, for instance, specify the feature, the action to be performed on the feature, the current state of the feature, the declaration information, and a current status of the transaction. In one embodiment, the transaction is generated by merging contents of a canonical request (e.g., created by a proxy device based on the verb-noun request) with a current state of the feature. In some embodiments, the transaction may be a long-transaction stored in the transaction database 115. Additionally, or alternatively, the transaction may specify an intended state of the feature. As mentioned, in particular embodiments, the request may include the minimal information necessary to create, or update, the transaction. On the other hand, the transaction may be based on the request, the current state of the feature, and one or more other requests, for instance, to provide the explicit action and status.

Once the transaction is generated, platform 101 determines, as in step 509, a response indicating the current state of the feature is updated by the transaction. By way of example, resource manager 119a processes a transaction to provision bandwidth and platform 101 updates a current state (e.g., bandwidth provisioned) and sends a response to user device 103a that the bandwidth has been provisioned. As is discussed further with regards to FIG. 6B, a single verb-noun (or canonical request) may result in multiple child responses. In one embodiment, the platform 101 waits until all child responses are received before sending a response to the request. Once the response is received, user device 103a displays an indication relating to the response by the user interface. For example, a response indicating an availability of bandwidth necessary to establish a requested connection to user device 103b may cause a display indicating that a connection is established to user device 103b.

Figure 6A:
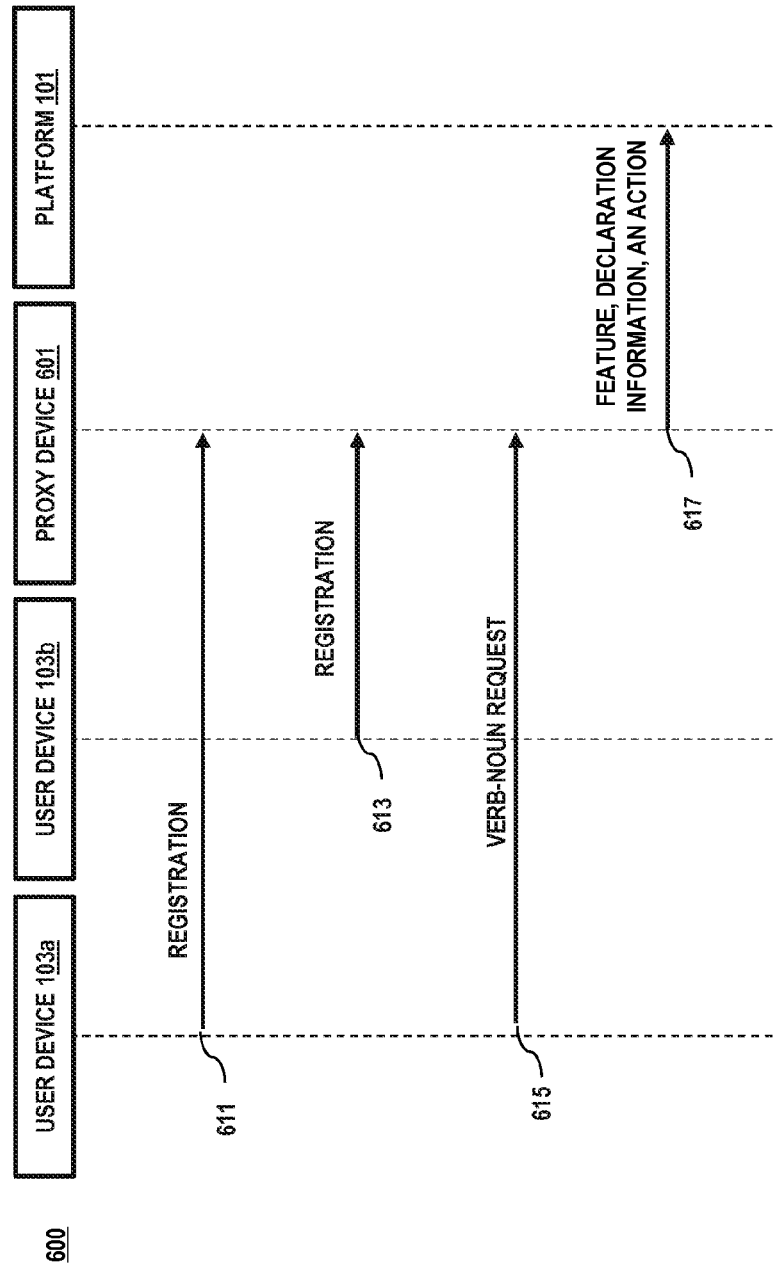
FIGS. 6A and 6B are ladder diagrams of a process for providing a request in a request-oriented service architecture, according to an exemplary embodiment.
Figure 6B:
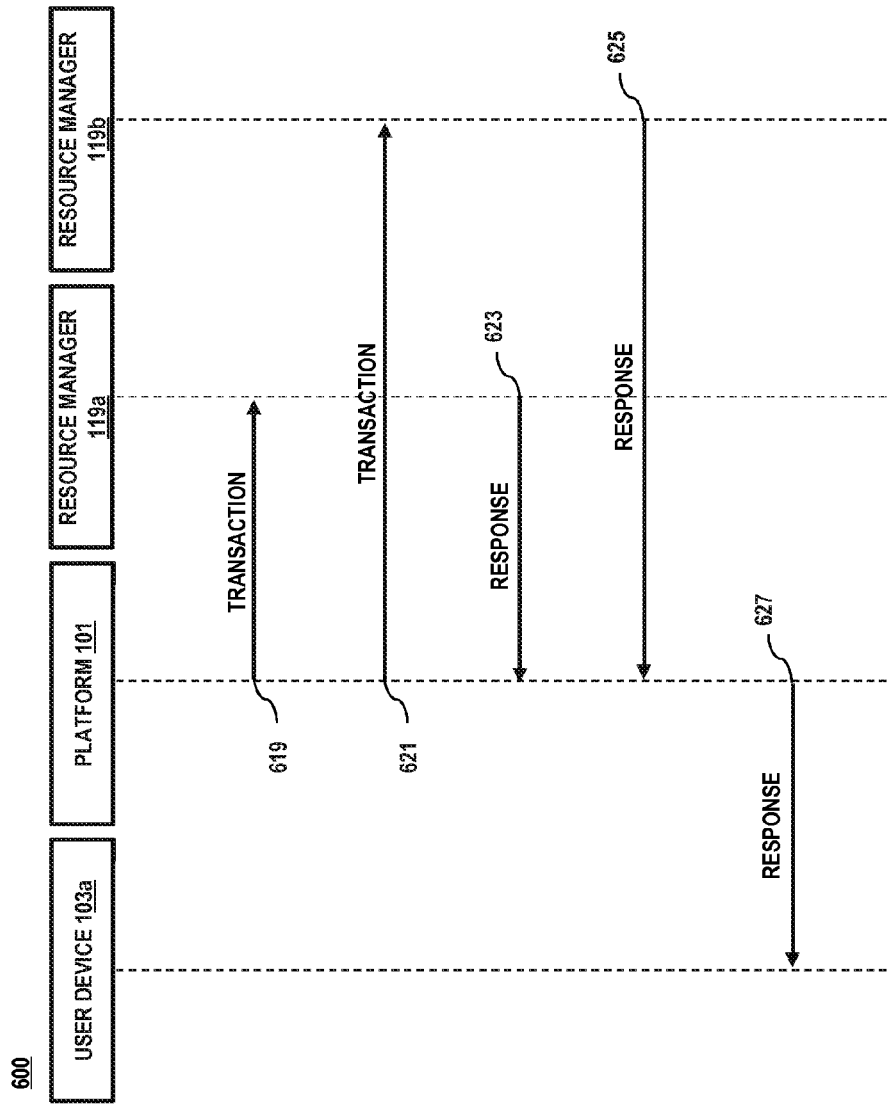

FIGS. 6A and 6B are ladder diagrams of a process for providing a request in a request-oriented service architecture, according to an exemplary embodiment 600. The exemplary embodiment 600 includes a user device 103a, user device 103b (shown in FIG. 6A), Proxy device 601 (shown in FIG. 6A), platform 101, resource manager 119a (shown in FIG. 6B), and resource manager 119b (shown in FIG. 6B). In the exemplary embodiment, user devices 103a and 103b register, as in steps 611 and 613, with a proxy device 601. In the embodiment, registration of user device 103a (e.g., user's primary mobile device) is performed automatically by device recognition (e.g., MAC address, Mobile Device Number (MDN), subscriber identity module (SIM), etc.) of user device 103a and registration of user device 103b (e.g., public computing device, secondary mobile device, etc.) is performed by the authentication of credentials input by the user. Once registered the process described herein is substantially similar with regards to user devices 103a and 103b because a proxy device 601 is configured to transmit information to and from platform 101 and resource managers 119 for the benefit of a user associated with user devices 103a and 103b. That is, a user may indicate (e.g., user input, default settings, etc.) a preferred user device or devices to send requests and receive responses. Next, the user inputs a verb-noun request to establish a voice connection with voice station 121 into user device 103a, which sends, as in step 615, the request to proxy device 601. The proxy device 601 then converts the verb-noun request into a canonical request that contains a feature, declaration information, and an action based on the verb-noun request and sends, as in step 617, the canonical request to the platform 101.

The platform 101 determines a current state of the feature indicated in the canonical request, generates a transaction that is the canonical request merged with the current state, and sends, as in steps 619 and 621, a transaction to resource managers 119a and 119b, which process the transactions to cause an update to the current state of the feature. That is, a single request (e.g., verb-noun, canonical) generates multiple transactions as discussed with respect to FIG. 3. For example, resource manager 119a processes a request to provision bandwidth, and resource manager 119b processes a request to access a telephony connection to a voice station (e.g., voice station 121). In this manner, new products (e.g., telephonic services using a data connection) may be implemented using disparate systems (e.g., resource managers 119*a* and 119*b*) by use of a verb-noun request. Once processed, (e.g., bandwidth is provisioned, and a telephony connection is established) responses, as in steps 623 and 625, are sent to the platform 101. In the exemplary embodiment, platform 101 waits to update the feature and send a response, as in step 627, until responses are received from resource managers 119*a* and 119*b* (i.e. steps 623 and 625). In this manner, a request (e.g., establish a connection with voice station 121) is not indicated as complete in a response until all child responses are received (e.g., a bandwidth is provisioned and a connection is established.).

Figure 7:
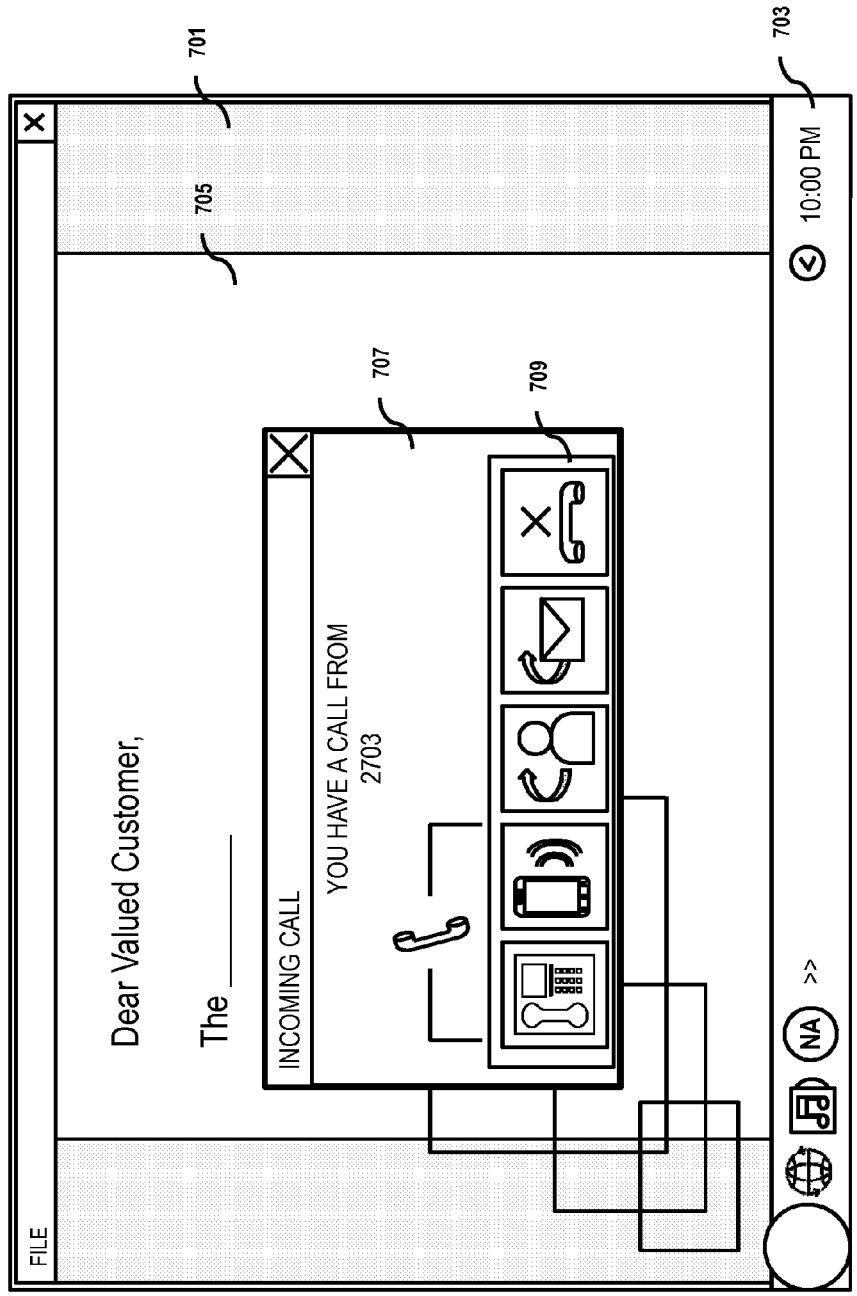
FIG. 7 is an illustration of one embodiment for providing a request in a request-oriented service architecture using a notification agent, according to various exemplary embodiments.

FIG. 7 is an illustration of one embodiment for providing a request in a request-oriented service architecture using a notification agent, according to various exemplary embodiments. As used herein, a notification agent is software configured to operate even when not displayed on a user display (e.g., operating in the background). In the exemplary embodiment, an operating system 701 displays a toolbar 703, a window 705 for a word processing program, an event window 707 associated with a notification agent, and selectable options 709 associated with the notification agent. The toolbar 703 displays selectable options associated with various programs, such as the operating system 701, a web browser, a music player, and a notification agent. In the illustration of an embodiment, the notification agent program determines an event (e.g., incoming call) and causes the operating system 701, which is displaying window 705 for a word processing program, to display an event window 707 associated with the notification agent. In this manner, operating system 701 notifies a user of events even when the operating system 701 is configured to display a window associated with another program (e.g., word processing program). As used herein, events include, for example, a new voice mail, an incoming call, a confirmation that a call has been forwarded (e.g., to another user, to voicemail, etc.), a confirmation that a call has been placed (e.g., to another user), notification of activating a selective call forwarding (e.g., forwarding all calls to a first phone number to a second phone number during a preset time period), a resetting (i.e., removal) of an activated call forwarding, a call back reminder, and the like. Additionally, the event window 707 includes selectable options 709 which include, for example, an option to answer a call on a hard phone or softphone, an option to transfer a call to another user, sending (or forwarding) an incoming call to another user (or device), sending an incoming call to voice mail, and ignoring (or disconnecting) an incoming call. In this manner, a user may be notified of responses and requests of a request-oriented service architecture even when an operating system (e.g., operating system 701) is configured to display another program (e.g., a word processing program).

Figure 8:
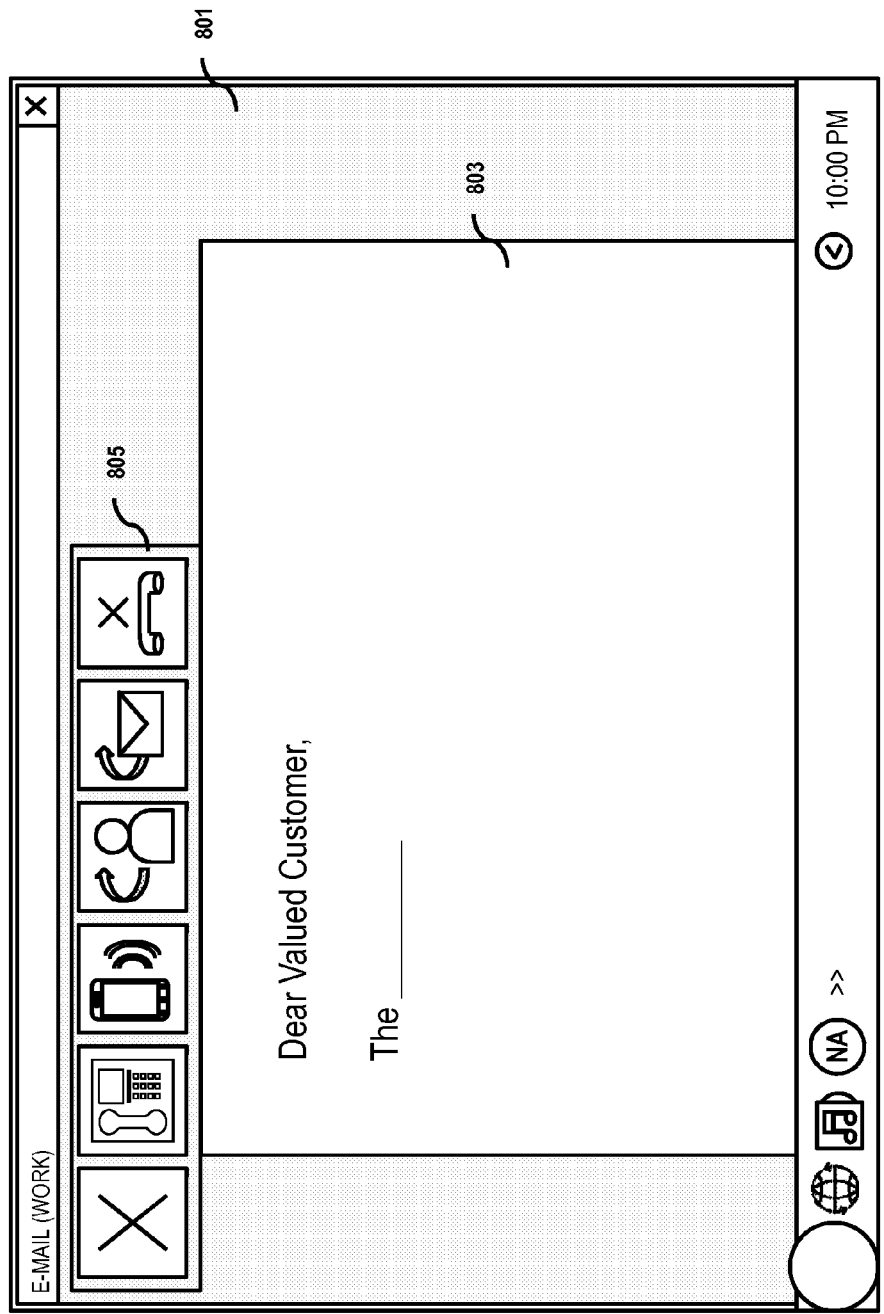
FIG. 8 is an illustration of one embodiment for providing a request in a request-oriented service architecture using a plug-in, according to various exemplary embodiments.

FIG. 8 is an illustration of one embodiment for providing a request in a request-oriented service architecture using a plug-in, according to various exemplary embodiments. As used herein, a "plug-in" is software that adds functional capabilities to another software application or process. In the exemplary embodiment, an operating system 801 displays an application window 803 for an e-mail software application (e.g., MICROSOFT OUTLOOK), and a plug-in toolbar 805. The plug-in toolbar 805 displays selectable options associated with the plug-in and the e-mail software application, such as a logout option, a speed dial option, a speed dial menu option, a call option, a voicemail option, a call management option, a call management menu option, a launch softphone option, a launch web option, and a dial a number option. In one embodiment, a user (or subscriber) of the platform 101 and/or resource manager 119*a* enters in credentials to enable the plug-in toolbar 805. Once enabled, the plug-in toolbar accesses a user's contact list associated with the application window 803 for the e-mail software application to create, modify, and manage services of the platform 101 and/or resource manager 119*a*. For example, users may use a calendar and scheduling functions of the e-mail software application to manage a call forwarding feature, a call blocking feature, a call waiting feature, conference call feature, a simultaneous call feature, and the like. That is, a user can, for example, schedule a conference call in the application window 803 using features of the e-mail software application and implement the conference call using features of the plug-in toolbar 805. In this manner, features of the plug-in toolbar 805 and of another software application may be used in a single application window (e.g., an application window 803 for an e-mail software application).

Figure 9A:
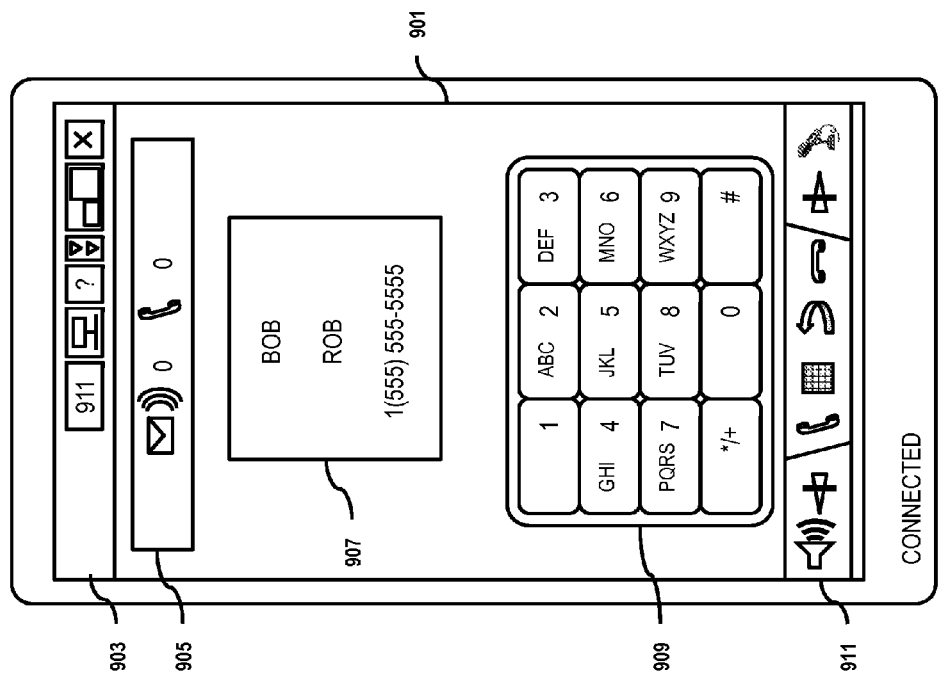
FIGS. 9A-9D are illustrations of one embodiment for providing a request in a request-oriented service architecture using a graphical user interface, according to various exemplary embodiments.
Figure 9B:
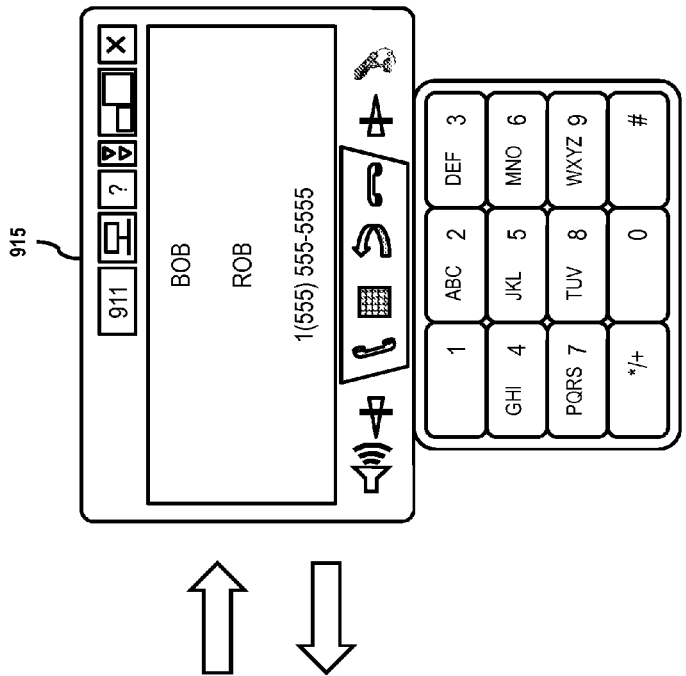
Figure 9B:
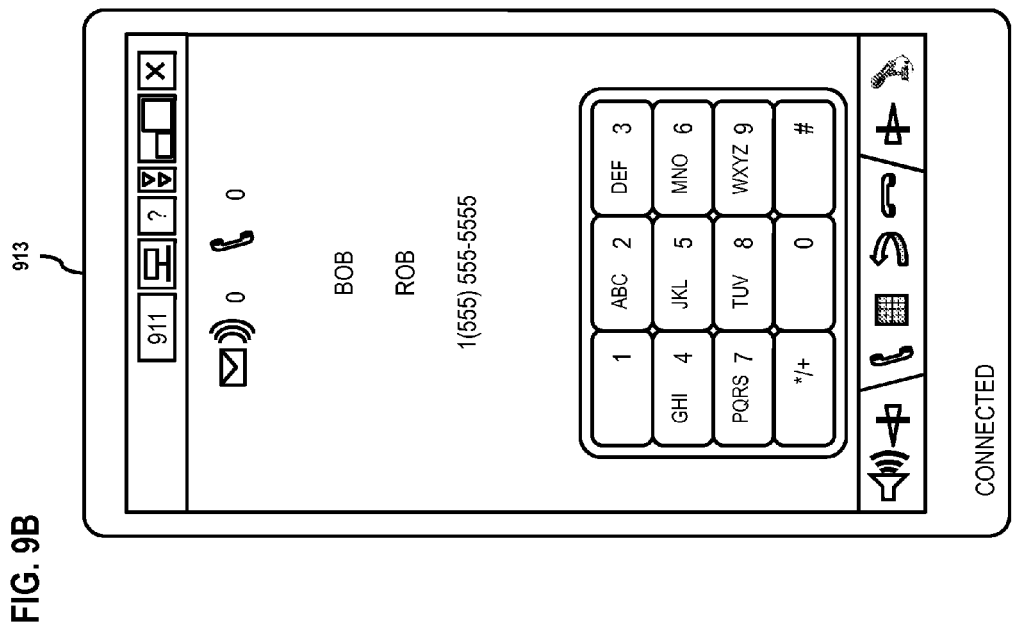
Figure 9C:
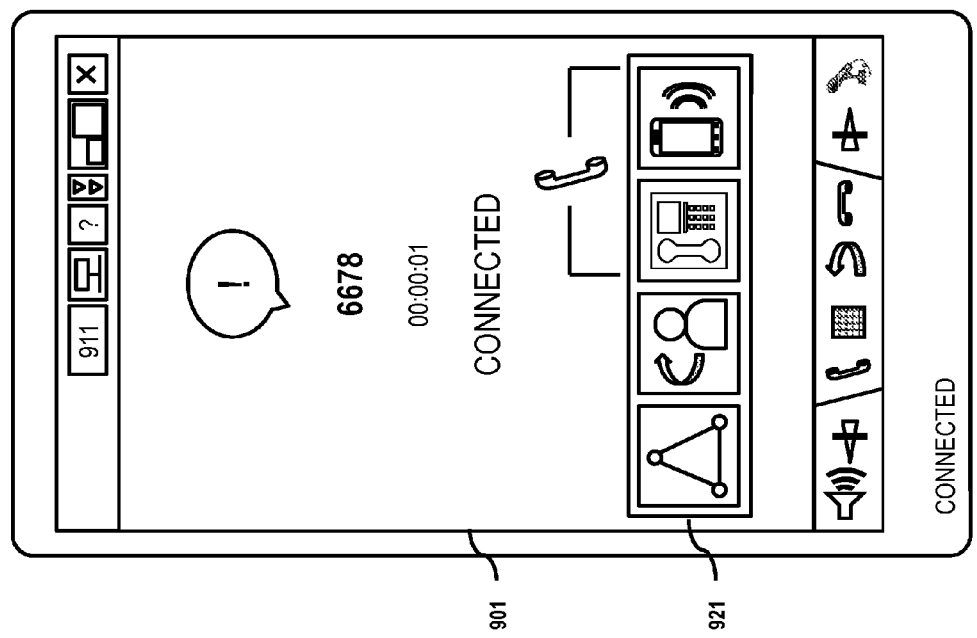
Figure 9D:
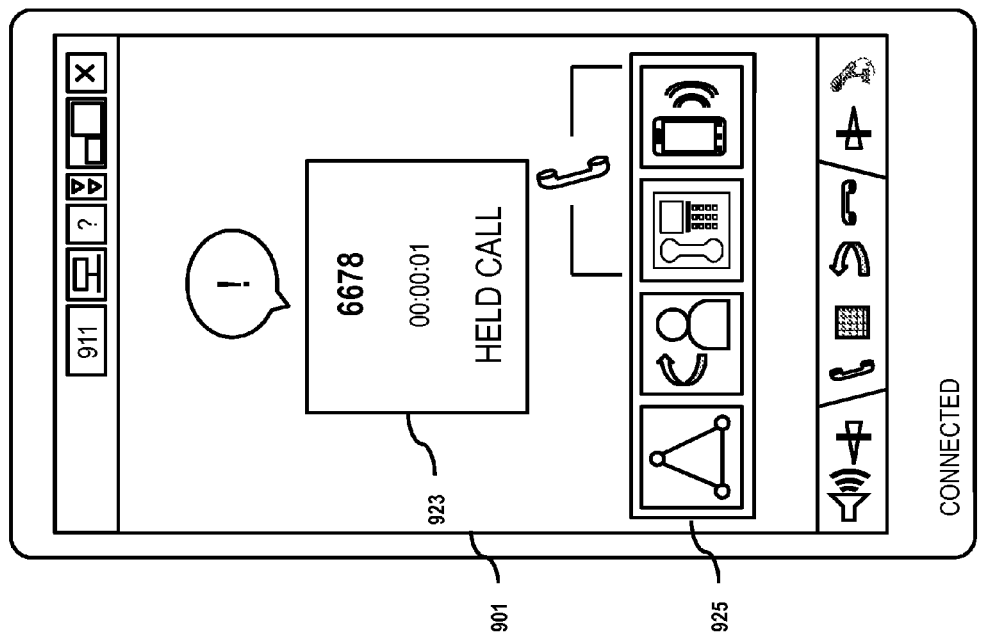

FIGS. 9A-9D are illustrations of one embodiment for providing a request in a request-oriented service architecture using a graphical user interface, according to various exemplary embodiments. In the exemplary embodiment, a soft phone interface 901 displays a top tool bar 903, status information bar 905, contact information window 907, soft keypad 909, and bottom toolbar 911. The top tool bar 903 displays selectable options associated with the soft phone interface 901, such as an option to update an emergency address, a soft phone active/inactive indicator, a help option, a toggle to adjust the display of soft phone interface 901, and an option to close the soft phone interface 901. An emergency address can be added to allow emergency responders access to a location entered into the phone interface 901 (or detected by a device configured with phone interface 901). The toggle of the display may, as shown in the exemplary embodiment in FIG. 9B, toggle the soft phone interface 901 from a normal, or default interface 913 to a skinny interface 915. The status information bar 905 displays, for example, a new voice mail indicator and a new missed call indicator. Additionally, the soft phone interface 901 may include a bottom toolbar 911 that includes, for example, an speaker on/off toggle button, a volume control, an answer button, a keypad open/close toggle button, a back button, a disconnect button, a microphone on/off toggle button, and a microphone volume control. As such, a user may initiate a communication session, for example, by entering in a phone number using the soft keypad 909, or selecting (e.g., touching) a pre-existing contact displayed in the contact information window 907. Once a communication session is established, the soft phone interface 901 may display options, as illustrated in FIG. 9C, to modify the communication session on a connection modification toolbar 921. The connection modification toolbar 921 includes, for example, an option to enable a three-way call feature, an option to forward the connection, and an option to hold/resume a connection. In this manner, a user may modify an existing communication session. Additionally, in response to a held call being detected, soft phone interface 901 may display, as illustrated in FIG. 9D, a held call information window 923 indicating the held connection, along with a held call connection toolbar 925 that includes an option to establish a connection to the held connection.

The processes described herein for providing a request-oriented service architecture may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
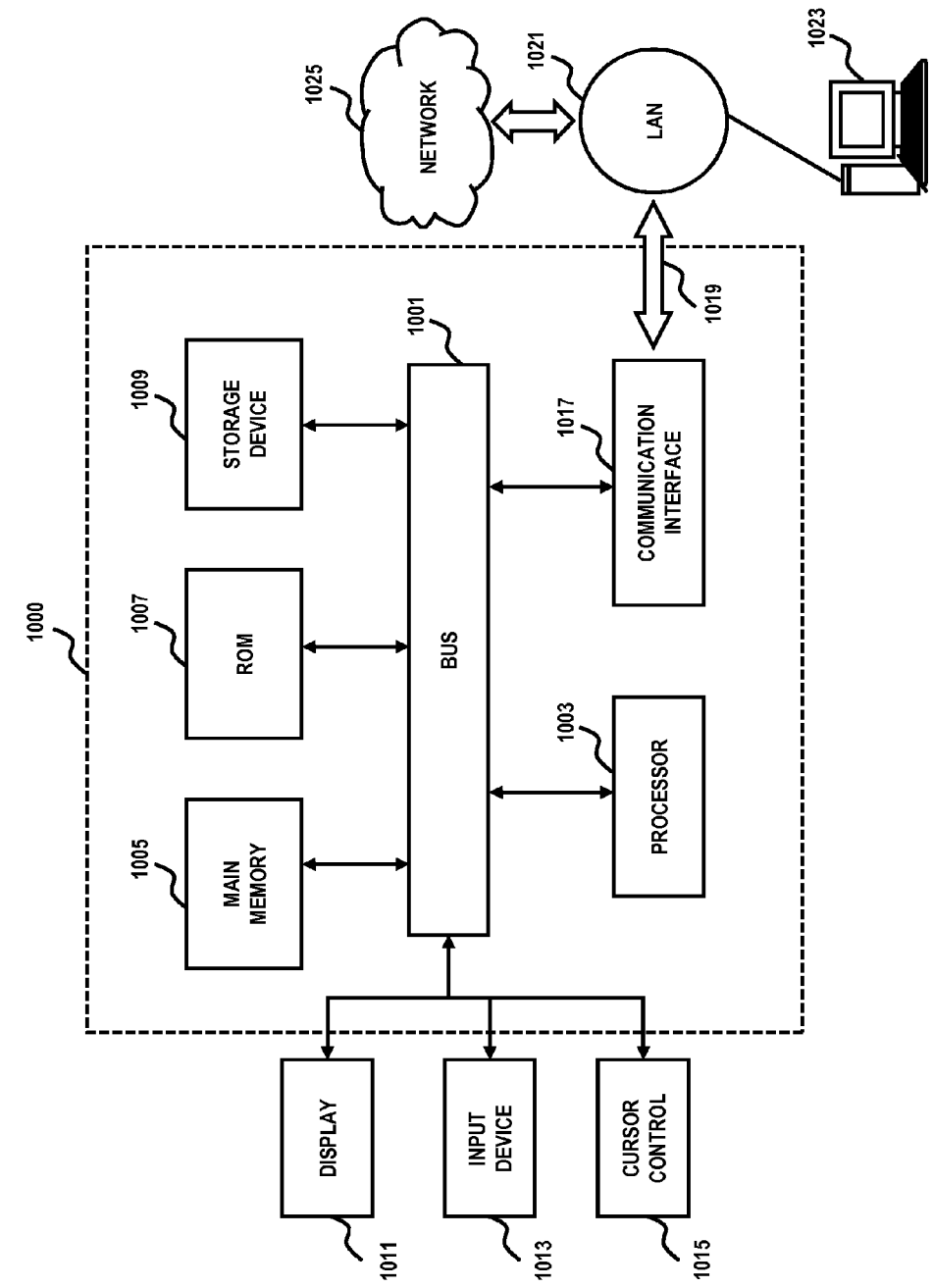
FIG. 10 is a diagram of a computer system that can be used to implement various exemplary embodiments.

FIG. 10 is a diagram of a computer system that can be used to implement various exemplary embodiments. The computer system 1000 includes a bus 1001 or other communication mechanism for communicating information and one or more processors (of which one is shown) 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk, flash storage, or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. Additional output mechanisms may include haptics, audio, video, etc. An input device 1013, such as a keyboard including alphanumeric and other keys, is coupled to the bus 1001 for communicating information and command selections to the processor 1003. Another type of user input device is a cursor control 1015, such as a mouse, a trackball, touch screen, or cursor direction keys, for communicating direction information and command selections to the processor 1003 and for adjusting cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
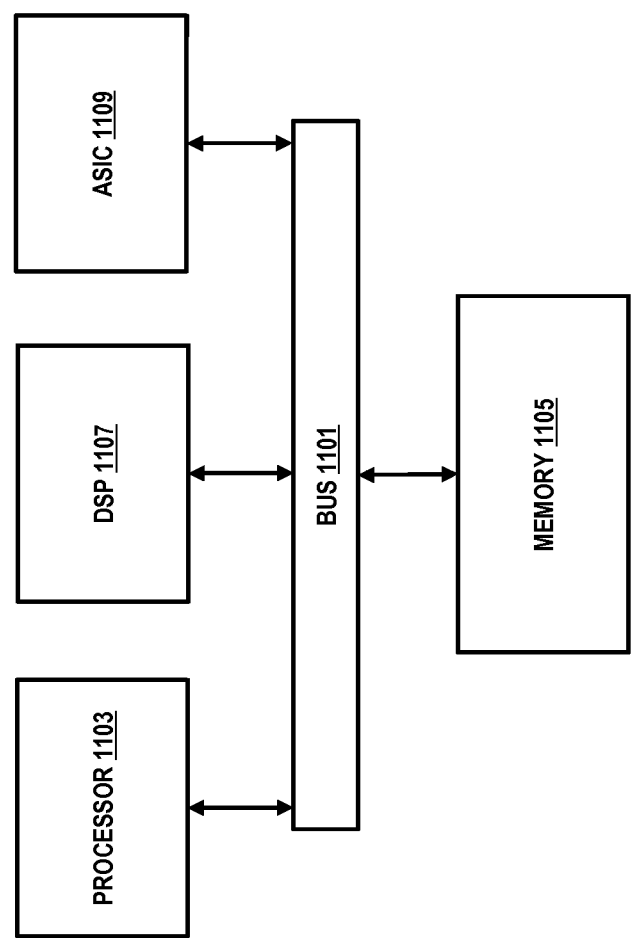
FIG. 11 is a diagram of a chip set that can be used to implement an embodiment of the invention.

FIG. 11 illustrates a chip set or chip 1100 upon which an embodiment of the invention may be implemented. Chip set 1100 is programmed to enable a request-oriented service architecture as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of enabling a request-oriented service architecture.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to enable a request-oriented service architecture. The memory 1105 also stores the data associated with or generated by the execution of the inventive steps.

Figure 12:
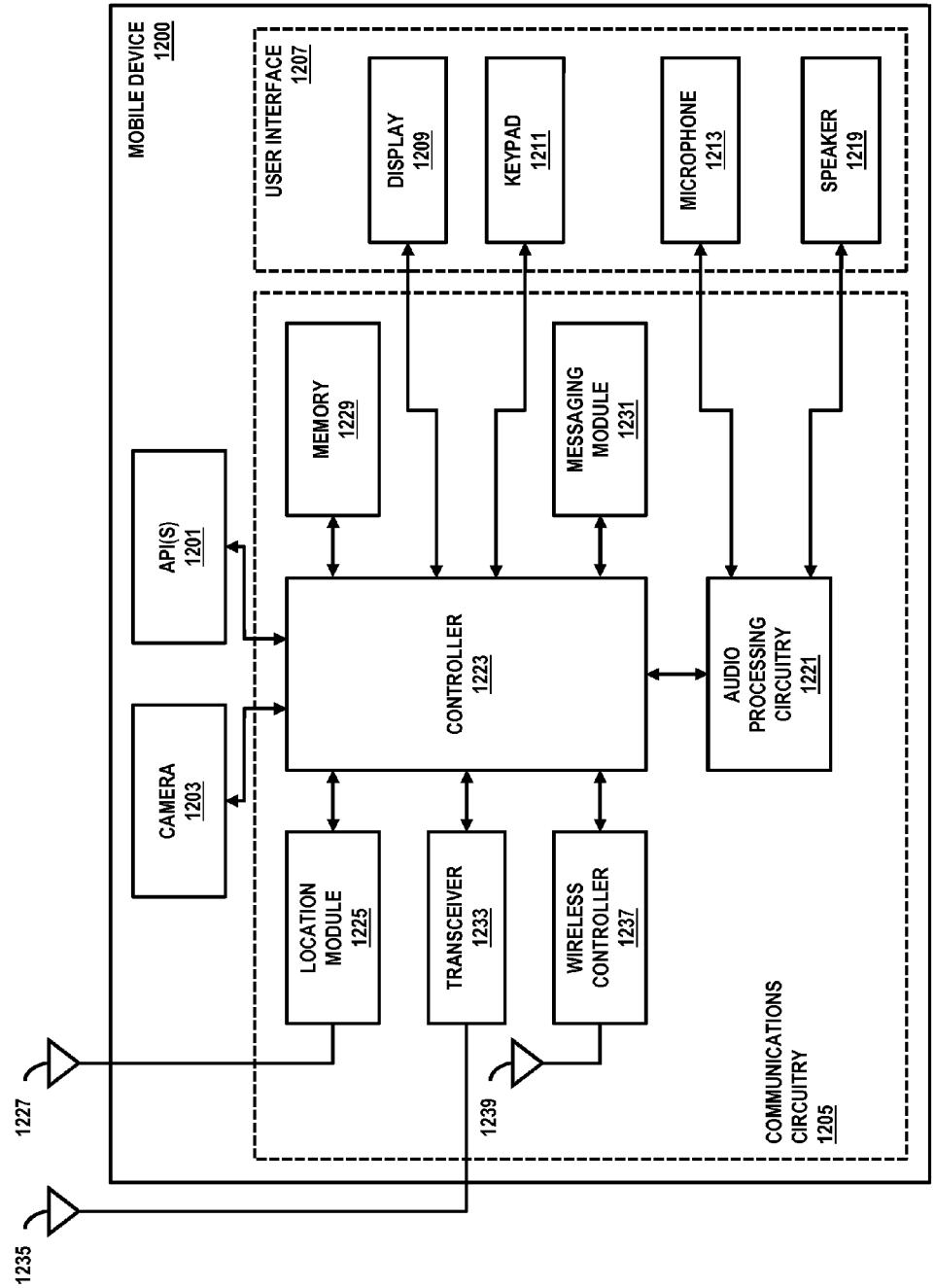
FIG. 12 is a diagram of a mobile device configured to facilitate providing a request in a request-oriented service architecture, according to an exemplary embodiment.

FIG. 12 is a diagram of a mobile device configured to facilitate a request in a request-oriented service architecture, according to an exemplary embodiment. Mobile device 1200 (e.g., equivalent to the user device 103) may comprise computing hardware (such as described with respect to FIGS. 10 and 11), as well as include one or more components configured to execute the processes described herein for facilitating a request in a request-oriented service architecture. In this example, mobile device 1200 includes application programming interface(s) 1201, camera 1203, communications circuitry 1205, and user interface 1207. While specific reference will be made hereto, it is contemplated that mobile device 1200 may embody many forms and include multiple and/or alternative components.

According to exemplary embodiments, user interface 1207 may include one or more displays 1209, keypads 1211, microphones 1213, and/or speakers 1219. Display 1209 provides a graphical user interface (GUI) that permits a user of mobile device 1200 to view dialed digits, call status, menu options, and other service information. Specifically, the display 1209 may allow viewing. The GUI may include icons and menus, as well as other text and symbols. Keypad 1211 includes an alphanumeric keypad and may represent other input controls, such as one or more button controls, dials, joysticks, touch panels, etc. The user thus can construct templates, enter field values, initialize applications, select options from menu systems, and the like. Specifically, the keypad 1211 may enable the inputting of characters and words. Microphone 1213 coverts spoken utterances of a user (or other auditory sounds, e.g., environmental sounds) into electronic audio signals, whereas speaker 1219 converts audio signals into audible sounds or utterances. A camera 1203 may be used as an input device to detect images, for example a quick response (QR) code.

Communications circuitry 1205 may include audio processing circuitry 1221, controller 1223, location module 1225 (such as a GPS receiver) coupled to antenna 1227, memory 1229, messaging module 1231, transceiver 1233 coupled to antenna 1235, and wireless controller 1237 coupled to antenna 1239. Memory 1229 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 1229 may be implemented as one or more discrete devices, stacked devices, or integrated with controller 1223.

Additionally, it is contemplated that mobile device 1200 may also include one or more applications and, thereby, may store (via memory 1229) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, signals received by mobile device 1200 from, for example, platform 101 may be utilized by API(s) 1201 and/or controller 1223 to facilitate the sharing of information, and improving the user experience.

Accordingly, controller 1223 controls the operation of mobile device 1200, such as in response to commands received from API(s) 1201 and/or data stored to memory 1229. Control functions may be implemented in a single controller or via multiple controllers. Suitable controllers 1223 may include, for example, both general purpose and special purpose controllers and digital signal processors. Controller 1223 may interface with audio processing circuitry 1221, which provides basic analog output signals to speaker 1219 and receives analog audio inputs from microphone 1213.

Mobile device 1200 also includes messaging module 1231 that is configured to receive, transmit, and/or process messages (e.g., enhanced messaging service (EMS) messages, SMS messages, MMS messages, instant messaging (IM) messages, electronic mail messages, and/or any other suitable message) received from (or transmitted to) platform 101 or any other suitable component or facility of system 100. As such, messaging module 1231 may be configured to receive, transmit, and/or process information shared by the mobile device 1200. For example, platform 101 can send an SMS information relating to a template, code word, and the like.

It is also noted that mobile device 1200 can be equipped with wireless controller 1237 to communicate with a wireless headset (not shown) or other wireless network. The headset can employ any number of standard radio technologies to communicate with wireless controller 1237; for example, the headset can be BLUETOOTH enabled. It is contemplated that other equivalent short range radio technology and protocols can be utilized. While mobile device 1200 has been described in accordance with the depicted embodiment of FIG. 12, it is contemplated that mobile device 1200 may embody many forms and include multiple and/or alternative components.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   presenting a user interface for a service, a product, or a combination thereof;
   determining a verb-noun request for instigating a task of the service, product, or combination thereof based on an input into the user interface;
   causing, by a processor and in response to the verb-noun request, a transmission of a transaction to accomplish the task, wherein the transaction contains declaration information, for causing an update to a current state of a feature, an action to be performed on the feature, and an indication of a current state of the feature;
   determining a response indicating the current state of the feature is updated by the transaction; and
   presenting an indication relating to the response by the user interface.

2. The method according to claim 1, wherein the feature is associated with the service, product, or combination thereof, and the declaration information contained in the transmitted transaction includes an indication of a concept library indicating a language neutral operation of type or a combination thereof.

3. The method according to claim 1, further comprising:
   causing generation of one or more child transactions based on the declaration information, contained in the transmitted transaction, wherein each of the one or more child transactions causes generation of a respective child response, and wherein the reception of the response indicating the current state of the feature is updated based on the one or more child responses.

4. The method of claim 1, further comprising:
   initiating an input, via the user interface, registering a user to an agent representing the user, wherein the registration subscribes the agent to a device configured to generate the feature, the declaration information, and the action to be performed on the feature based on the verb-noun request.

5. The method of claim 1, further comprising:
   initiating an input, via the user interface, into a first device offering to establish a connection to a second device, wherein the offering to establish a connection is by the verb-noun request.

6. The method of claim 5, further comprising:
   presenting, via the user interface, indication that the second device has accepted the offer to establish the connection based on the determined response.

7. The method of claim 6, further comprising:
   presenting, via the user interface, a selectable option that when selected causes, a forwarding of the connection to another device associated with a user associated with the first device or a sending of an offer to a third device to join the connection, wherein the connection is forwarded using another verb-noun request, and wherein the offer to a third device to join the connection is sent using another verb-noun request.

8. The method of claim 6, further comprising:
   presenting, via the user interface, a selectable option on the first device, the second device, or a combination thereof that when selected causes, a holding of the established connection, wherein the connection is held using another verb-noun request;
   presenting, via the user interface, indication that the established connection is held based on another response; and
   presenting, via the user interface, a selectable option on another device that when selected causes, an establishing of a connection between the another device and either the first device or the second device and a disconnection of the held connection, wherein the connection of the another device and the disconnection of the held connection is established using another verb-noun request.

9. The method of claim 1, wherein the user interface is generated by plug-in software or a user agent.

10. An apparatus comprising:
    at least one processor; and
    at least one memory including computer program code for one or more programs,
    the at least one memory and the computer program code configured to, with the at least one processor, cause the apparatus to perform at least the following,
    present a user interface for a service, a product, or a combination thereof;
    determine a verb-noun request for instigating a task of the service, product, or combination thereof based on an input into the user interface;

cause, in response to the verb-noun request a transmission of a transaction to accomplish the task, wherein the transaction contains declaration information, for causing an update to a current state of a feature, an action to be performed on the feature, and an indication of a current state of the feature;

determine a response indicating the current state of the feature is updated, at least in part, by the transaction; and present an indication relating to the response by the user interface.

11. The apparatus according to claim 10, wherein the feature is associated with the service, product, or combination thereof, and the declaration information includes a behavior declaration, a structure declaration, or a combination thereof associated with the transaction, the feature, or a combination thereof.

12. The apparatus according to claim 10, wherein the apparatus is further caused to:

cause, at least in part, a generating of one or more child transactions based on the declaration information, contained in the transmitted transaction, wherein each of the one or more child transactions causes, at least in part, a generation of a respective child response, and wherein the reception of the response indicating the current state of the feature is updated based, at least in part, on the one or more child responses.

13. The apparatus according to claim 10, wherein the apparatus is further caused to:

initiate an input, via the user interface, registering a user to an agent representing the user, wherein the registration subscribes the agent to a device configured to generate the feature, the declaration information, and the action to be performed on the feature based on the verb-noun request.

14. The apparatus according to claim 10, wherein the apparatus is further caused to:

initiate an input, via the user interface, into a first device offering to establish a connection to a second device, wherein the offering to establish a connection is by the verb-noun request.

15. The apparatus according to claim 14, wherein the apparatus is further caused to:

present, via the user interface, indication that the second device has accepted the offer to establish the connection based on the determined response.

16. The apparatus according to claim 15, wherein the apparatus is further caused to:

present, via the user interface, a selectable option that when selected causes, a forwarding of the connection to another device associated with a user associated with the first device or a sending of an offer to a third device to join the connection, wherein the connection is forwarded using another verb-noun request, wherein the connection is forwarded using another verb-noun request, and wherein the offer is sent using another verb-noun request.

17. The apparatus according to claim 15, wherein the apparatus is further caused to:

present, via the user interface, a selectable option on the first device, the second device, or a combination thereof that when selected causes, a holding of the established connection, wherein the connection is held using another verb-noun request; present, via the user interface, indication that the established connection is held based on another response; and present, via the user interface, a selectable option on another device that when selected causes, an establishing of a connection between the another device and either the first device or the second device and a disconnection of the held connection, wherein the connection of the another device and the disconnection of the held connection is established using another verb-noun request.

18. The method of claim 10, wherein the user interface is generated by plug-in software or a user agent.

19. A non-transitory computer readable medium having stored therein instructions executable by a computing device to cause the computing device to perform functions of:

presenting a user interface for a service, a product, or a combination thereof;

determining a verb-noun request for instigating a task of the service, product, or combination therefore based on an input into the user interface;

causing, in response to the verb-noun request transmission of a transaction to accomplish the task, wherein the transaction contains, declaration information for causing an update to a current state of a feature, an action to be performed on the feature, and an indication of a current state of the feature;

determining a response indicating the current state of the feature is updated by the transaction; and presenting an indication relating to the response by the user interface.

20. The non-transitory computer readable medium of claim 19, wherein the computing device is caused to further perform:

initiating an input, via the user interface, registering a user to an agent representing the user, wherein the registration subscribes the agent to a device configured to generate the feature, the declaration information, and the action to be performed on the feature based on the verb-noun request.

* * * * *